United States Patent
Rusu et al.

Patent Number: 6,111,880
Date of Patent: Aug. 29, 2000

[54] HYBRID PACKET/CELL SWITCHING, LINKING, AND CONTROL SYSTEM AND METHODOLOGY FOR SHARING A COMMON INTERNAL CELL FORMAT

[75] Inventors: Marinica Rusu, Sunnyvale; Ihab A. Jaser, San Jose, both of Calif.

[73] Assignee: Whittaker Corporation, Simi Valley, Calif.

[21] Appl. No.: 08/986,156

[22] Filed: Dec. 5, 1997

[51] Int. Cl.[7] ...................................................... H04J 3/24
[52] U.S. Cl. .......................... 370/395; 370/401; 370/466; 370/469
[58] Field of Search ..................................... 370/395, 396, 370/397, 398, 401, 402, 465, 466, 467, 468, 469

[56] References Cited

U.S. PATENT DOCUMENTS

| | | | |
|---|---|---|---|
| 4,970,721 | 11/1990 | Aczel et al. | 370/466 |
| 5,490,252 | 2/1996 | Macera et al. | 370/402 |
| 5,724,358 | 3/1998 | Headrick et al. | 370/418 |
| 5,757,793 | 5/1998 | Read et al. | 370/358 |
| 5,850,395 | 12/1998 | Hauser et al. | 370/398 |

*Primary Examiner*—Douglas W. Olms
*Assistant Examiner*—Shick Hom
*Attorney, Agent, or Firm*—Sitrick & Sitrick

[57] ABSTRACT

The present invention is directed to a hybrid packet/cell switching, linking, and control system and methodology for sharing a common internal cell format that supports multiple protocol operations to support both high speed Ethernet and ATM. The architecture is a shared memory common internal cell architecture (ATM is the preferred embodiment), providing capabilities that support multicast data traffic (which is specific in a LAN environment) and accommodates a large shared buffer and linked list queue set groupings to control reading and retrieving the cell and packet encapsulated cell data types to permit intercoupling all combinations of cross/hybrid switching. The new hybrid switch provides both a full non-blocking packet (e.g., Ethernet) switch having a plurality of ports (e.g., 32 @ 100 Mbps (full or half duplex) ports) and a full non-blocking cell (e.g., ATM) switch having a plurality of ports (e.g., 32 @ 155 Mbps ports). In one embodiment, one or more ports can be used internally on the board for SAR functions. The hybrid switch supports a variety of interfacing speeds and types (e.g., from 10 Mbps Ethernet to 622 Mbps ATM ports, either directly or by additional multiplexing functions), while supporting mixed operation (i.e., ATM and Ethernet) in the same switch. The mixed operation is performed at the queue level. Supporting applications like LAN (Local Area Network) at the switch level especially benefit from the segmentation and reassembly feature being an intrinsic part of the switch design.

18 Claims, 7 Drawing Sheets

(Data Flow for 113 of Fig. 2)

HYBRID PACKET/CELL SWITCHING, LINKING, AND CONTROL SYSTEM AND METHODOLOGY FOR SHARING A COMMON INTERNAL CELL FORMAT

BACKGROUND OF THE INVENTION

This invention relates to computer networks, and more particularly, to network switches, such as Ethernet or ATM switches.

FIELD OF THE INVENTION

There is a high level of similarity between the Ethernet and ATM (Asynchronous Transfer Mode) switching. A significant difference is that in ATM, the 'packets' are fixed in size (53 bytes). Many modern Ethernet switches are converting the variable length packets into fixed length pieces of information, such as in switched Ethernet products. Inside an ATM switch, the 53 bytes ATM cell is also converted into a proprietary switch cell, usually by appending switch routing information to the cell. Some commercial implementations of ATM switches are based on shared memory architecture.

SUMMARY OF THE INVENTION

The present invention is directed to a hybrid packet/cell switching, linking, and control system and methodology for sharing a common internal cell format that supports multiple protocol operations to support both high speed Ethernet and ATM. The architecture is a shared memory common internal cell architecture (ATM is the preferred embodiment), providing capabilities that support multicast data traffic (which is specific in a LAN environment) and accommodates a large shared buffer and linked list queue set groupings to control reading and retrieving the cell and packet encapsulated cell data types to permit intercoupling all combinations of cross/hybrid switching.

The new hybrid switch provides both a full non-blocking packet (e.g., Ethernet) switch having a plurality of ports (e.g., 32 @ 100 Mbps (full or half duplex) ports) and a full non-blocking cell (e.g., ATM) switch having a plurality of ports (e.g., 32 @ 155 Mbps ports). In one embodiment, one or more ports can be used internally on the board for SAR functions (described in detail hereinbelow).

The hybrid switch supports a variety of interfacing speeds and types (e.g., from 10 Mbps Ethernet to 622 Mbps ATM ports, either directly or by additional multiplexing functions), while supporting mixed operation (i.e., ATM and Ethernet) in the same switch. The mixed operation is performed at the queue level. Supporting applications like LAN (Local Area Network) at the switch level especially benefit from the segmentation and reassembly feature being an intrinsic part of the switch design.

These and other aspects and attributes of the present invention will be discussed with reference to the following drawings and accompanying specification.

BRIEF DESCRIPTION OF THE DRAWINGS

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

DETAILED DESCRIPTION OF THE EMBODIMENT

Figure 1:
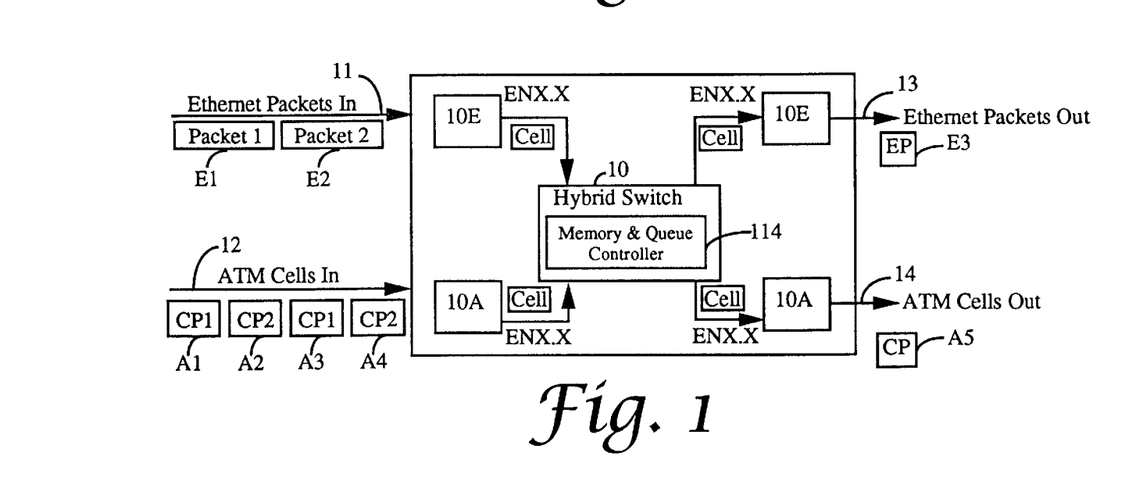
FIG. 1 illustrates a system block diagram of a hybrid switch system in accordance with the present invention, showing separate packet (Ethernet) and cell (ATM) inputs and separate Ethernet and ATM outputs with the hybrid switch fabric and core illustrated.

Referring to FIG. 1, a block diagram of a hybrid switching system 5 embodiment in accordance with the present invention is illustrated. External sources provide datagrams of information, including Ethernet packets E1 and E2, from source 11, and ATM cells CPA1, CPA2, CPA3, CPA4 from source 12. The source of Ethernet packets input 11 is coupled to Ethernet interface subsystem 10E, which creates and selectively couples ATM cell segments for the incoming packets to the hybrid switch core 101 as described in detail hereinbelow.

The ATM cell inputs sources 12 are coupled to an ATM interface subsystem 10A, which selectively provides ATM cells to the hybrid switch 20. A CPU 25 with the system 5 loads and updates all lookup tables and control memories responsive to the ATM protocols being executed by the system.

The hybrid switch 20 includes a memory and controller 114 that provides queue management control functions as described hereinafter. Ethernet packets and ATM cell outputs from the hybrid switch are reconstructed by the Ethernet output interface portion of the interface system 10E to provide Ethernet packet outputs 13 (Ethernet packets 53). Alternatively, the hybrid switch 5 can provide ATM cell outputs via ATM interface output subsystem 10A portion of the interface subsystem 10A. The ATM cell outputs A5 are output from the ATM cell output 14.

Input subsystems 10A, 10B accept corresponding incoming data (E1–E2/A1–A4), convert it to a common format, and couple the data in the common format to the queue controller 114. The queue controller 114 is coupled to receive data from input subsystems 10A, 10B (such as via respective input multiplexers) and provides data output (e.g., for coupling to output demultiplexers) and therefrom to the output processors 10A, 10B to provide respective outputs A5, E3. The queue controller 114 is also coupled to the queue memory (see 108 of FIG. 7). The queue controller 114 processes, stores, and transmits data between input subsystems and output subsystems using the queue memory. The queue controller establishes, maintains, and provides management of the queue operation and the memory utilization.

Incoming packet (e.g., Ethernet) data frames of varying length (e.g., from 108 bits to 1582 bits) or ATM cells having a fixed cell length (e.g., of 53 bytes) enter the input subsystems 10E, and 10A, respectively. In a preferred embodiment, there are eight input subsystems, each controlling four channels, to provide for thirty-two channel capacity. For example, each input subsystem (10A and 10E, respectively) can support up to four ATM interfaces at 155 Mbps or four fast Ethernet interfaces at 100 Mbps. In an alternate embodiment, the four ATM interfaces may be replaced by one 622 Mbps ATM interface or by a multiple of ATM interfaces at lower speeds.

In the illustrated example as shown in FIG. 1, input signal source 10E provides Ethernet data, and input signal source 10A provides ATM data. Alternatively, the input subsystems 10A, and 10B can be uniprotocol, that is, all ATM or all Ethernet.

The input subsystems 10A, and 10E establish a connection and terminate the physical network layer for the data communication. The physical layer of the incoming data is part of the received header which establishes a connection. Processing the physical data layer of ATM and Ethernet is very similar. Physical layer processing is based on well known industry standards.

Figure 7:
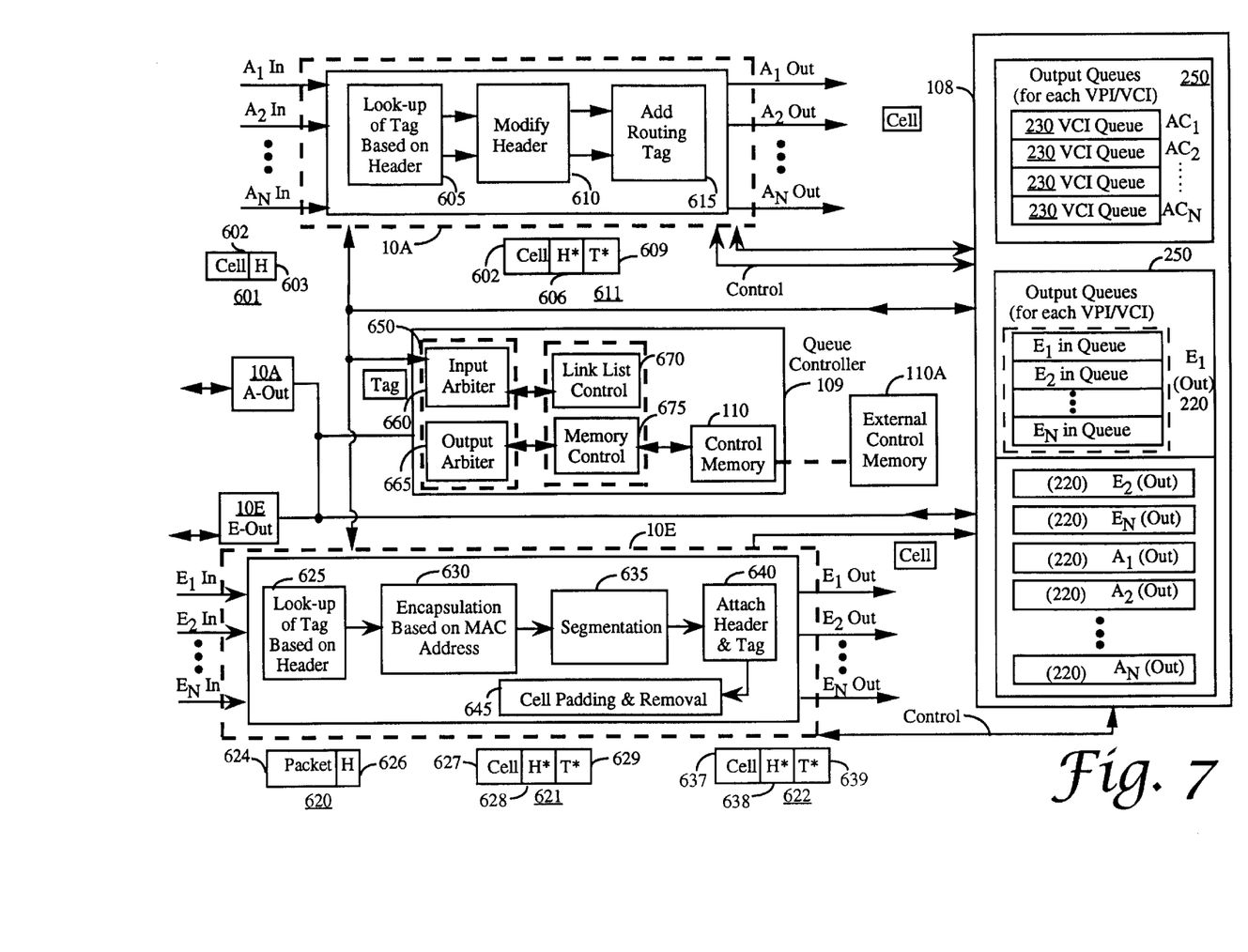
FIG. 7 illustrates a system block diagram, similar to FIG. 2, but providing greater detail on cell data flow and the organization of the cell buffer memory 108, showing the cell buffer memory's logical organization in accordance with the structure maintained in the control memory 100 as illustrated in FIG. 4.

Referring to FIG. 7, received Ethernet packets 624 (normally coming from a conventional Media Access Control (MAC) device) are buffered in a MAC interface. As soon as a minimum packet length is received, a lookup function is implemented by the queue controller 109 utilizing lookup memory 625 to gather routing information. After the lookup and routing appendage is complete, a segmentation function 635 is executed by the queue controller 109. The segmentation function splits the variable length Ethernet packets 624 into internal cells (627, 637) processable as ATM cells. Housekeeping and encapsulation (such as ensuring packet size and producing parity) is then performed. After this conversion and preparation, the internal cells are then ready to be sent, stored, and re-routed under the control of the queue controller 109.

Also, as shown in FIG. 7, ATM cell data 602 is received at the input port $A_1$–$A_N$ of input subsystem 10A. The queue controller 109 then appends a header with the value from a lookup memory 603 based on the VP/VC (Virtual Path/Virtual Channel) number in the header, and a lookup function is executed by the queue controller 109. The result of the lookup is then appended to the internal cell by the input processor 10A. The queue controller 109 supplies queue management information which is also appended to the cell header by the input processor 10A. The appended cell is then buffered in memory 108. The appended cell is then sent to the queue controller 109 which provides for the queue memory 108 selection management and storage control.

Figure 2:
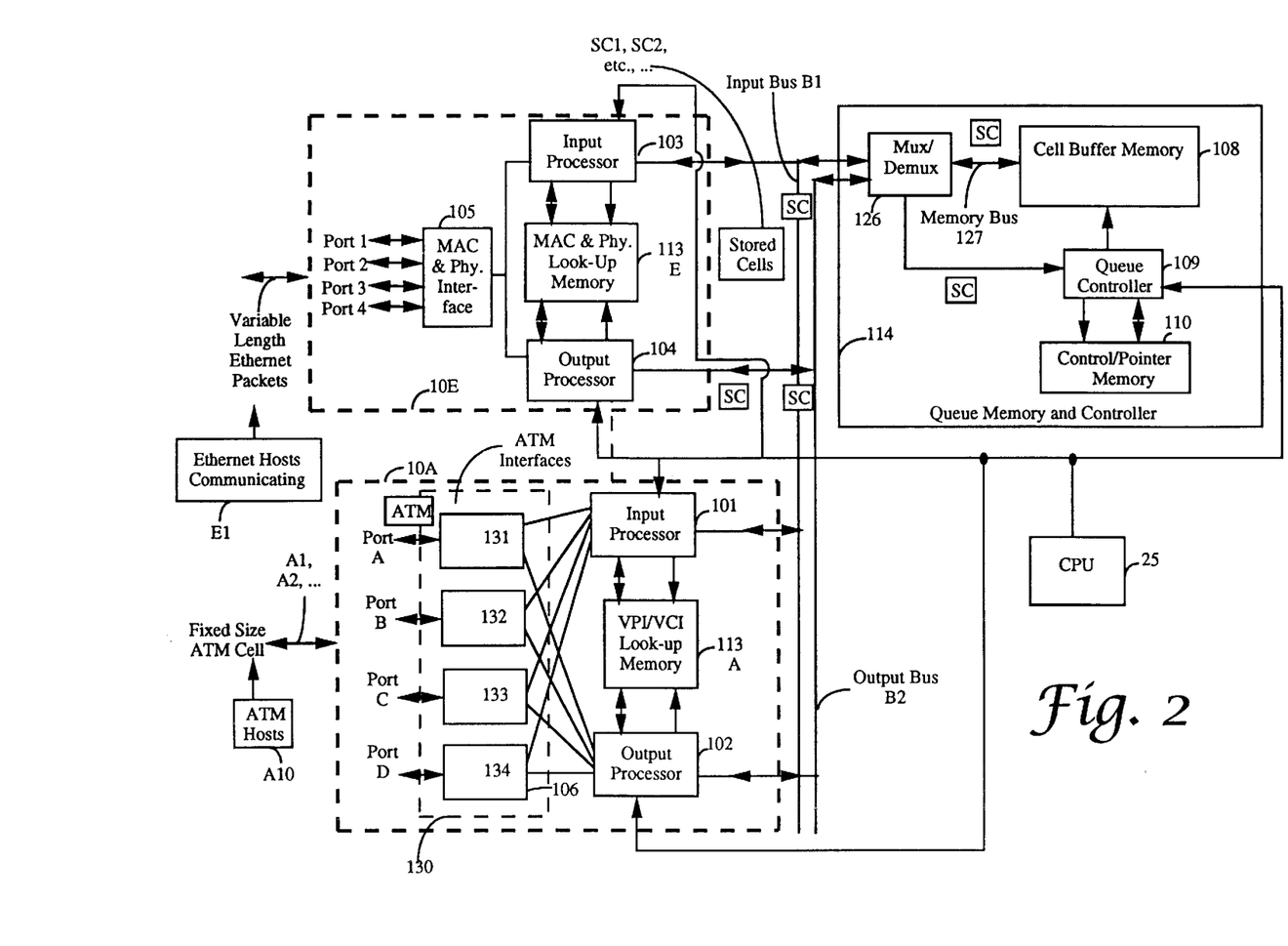
FIG. 2 illustrates a more detailed expansion of the system illustrated in FIG. 1.

Referring to FIG. 2, a plurality of Ethernet hosts E1 communicate variable length Ethernet packets, coupled to ports 1, 2, 3, and 4, which couple to address translation of media access controller (MAC) addresses 1505 and physical layer addresses, providing interface to input and output processors 103 and 104, respectively, of variable length Ethernet packets. The input processor 103 converts the Ethernet packets into associated ATM cells which are output as cells to be stored (SC1, SC2 . . . ), which are coupled to a multiplexer/demultiplexer 126 which couples the SC cells to the queue controller 109 which selectively enables the multiplexer/demultiplexer to couple the cell to be stored to the cell buffer memory 108 (or the stored cell from the buffer 108).

In a preferred embodiment, the cell buffer memory 108 is comprised of synchronous dynamic RAM chips. In today's commercial environment, SDRAM chips provide adequate cell buffer memory for the Ethernet and ATM application as described herein. Alternatively, other types of read/write memory can be used, such as other types of dynamic RAM, static RAM, CCD memory, etc.

A CPU 25 is coupled to the queue controller 109, and the input processors 101, 103, and output processors 102, 104, to provide for data communications and control of loading and updating the various control memories 110 and VPI/VCI lookup memories 113A, 113E, so as to provide for control in accordance with the ATM protocols being handled by the hybrid switch systems.

Figure 3:
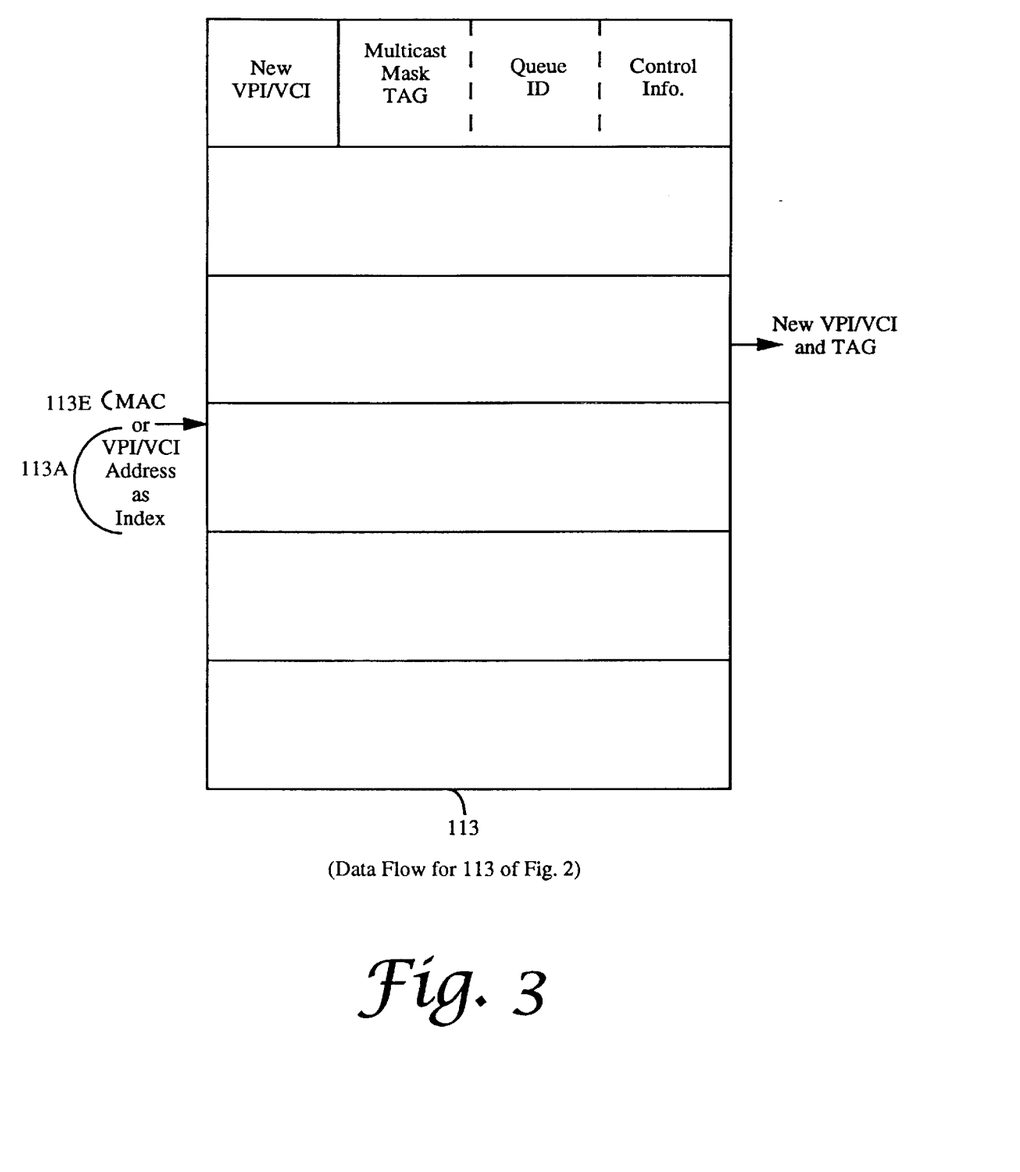
FIG. 3 illustrates the data flow and memory structure for VPI/VCI 113 of FIG. 2.

Referring to FIG. 3, the VPI/VCI look-up table memory and of FIG. 2 is illustrated in further detail, illustrating the data structure utilized in one preferred embodiment. There are four fields of data These are:

1. New VPI/VCI—the new header information to be rewritten into the ATM cell;
2. Multi-cast MASK TAG—the MASK for enabling multi-cast;
3. Queue ID—identifies the queue where the cell should be stored; and
4. Control information—contains various flags needed for data manipulation.

Figure 4:
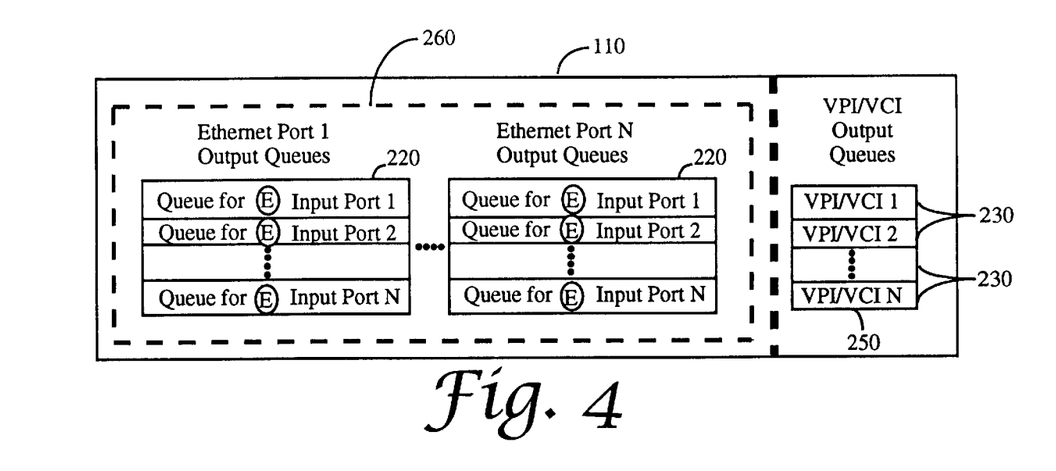
FIG. 4 illustrates the control pointer memory storage architecture for maintaining queues relative to the cell data stored in the cell buffer memory 108, responsive to the queue controller 109.

Appropriate structures (such as illustrated in FIG. 4) for linked list maintenance are set up, and are adapted as needed to coordinate the changing of the lookup memories 113A, 113E responsive to the restructuring of the linked lists and the queues in a dynamic manner, thereby adapting the operation of the system in real time. The queue controller 109 is responsive to the control/pointer memory subsystem 110 for providing linkage and mapping of stored cells to appropriate respective tag and address information. Conversely, when an output processor is to receive communication from the queue controller 109, the queue controller 109 references the control pointer memory 110 to determine the locations in the cell buffer memory 108 from which to output the SC cells via the memory bus 127. The SC cells are selectively output from the multiplexer/demultiplexer 126 responsive to the queue controller 109 to provide an output to the output bus B2 coupled to the output processor 104.

Additionally, coupled to the input bus B1 and the output bus B2 is an ATM data interface subsystem 10A. In an analogous manner to that described above for the Ethernet interface subsystem 10E, the ATM interface subsystem 10A is coupled to a plurality of ATM hosts A10 providing fixed size ATM cells, A1, A2 . . . which are coupled to a plurality of ATM interfaces 131–134 having unique VPI/VCI addresses, which are all coupled to both input processor 101 and input processor 102. The ATM interfaces 131–134 provide an ATM data cell stream to the input processor 101 which, based upon a VPI/VCI lookup in the VPI/VCI lookup memory 113A, are selectively coupled to the cell buffer memory 108 via the input bus. Thereafter, the operation is analogous to that of the Ethernet interfaced system 10E and the queue memory and a controller 114, except that now communication is to the ATM interface system 10A.

Referring to FIG. 4, logical and structural storage for the lookup memories corresponding to 113A, 113E of FIG. 2 are illustrated as lookup memory 113. An incoming MAC address for lookup memory 113E, or an incoming VPI/VCI address for lookup memory 113A, provides an index or address into the respective lookup table in memory 113. The CPU 25 initially, and on an on-going basis, loads and updates the memory 113 with data corresponding to the MAC or VPI/VCI address indexes, as illustrated in FIG. 2, via the input processors and output processors of the corresponding interfaces 10A, 10E. Each input address corresponds to a storage location which includes a new VPI/VCI address and a tag associated with the input address. The new VPI/VCI address and the tag are then output from the lookup memory 113 for coupling, as appropriate, to the respective input and/or output processor of its respective interface. The tags are updated and loaded on an ongoing basis as the ATM protocol is followed by the switch system.

Referring to FIG. 4, the control memory 110 includes the illustrated structure for the maintenance of linked lists for queue control and organization of the cell buffers in the memory 108. The control memory 110 contains a structured set 260 of groupings 220 of lists, each providing pointers for each Ethernet port (1,2, ... N). Each Ethernet output port is provided with an output queue structure (the grouping 220 for that respective Ethernet output port) which includes a queue for each Ethernet input port that references that output queue. Additionally, a linked list structure 250 is maintained providing pointers to output queues 230 for each VPI/VCI output, with each VPI/VCI address having its own output queue 230 maintained independent of the origination input for that VPI/VCI address.

Figure 5A:
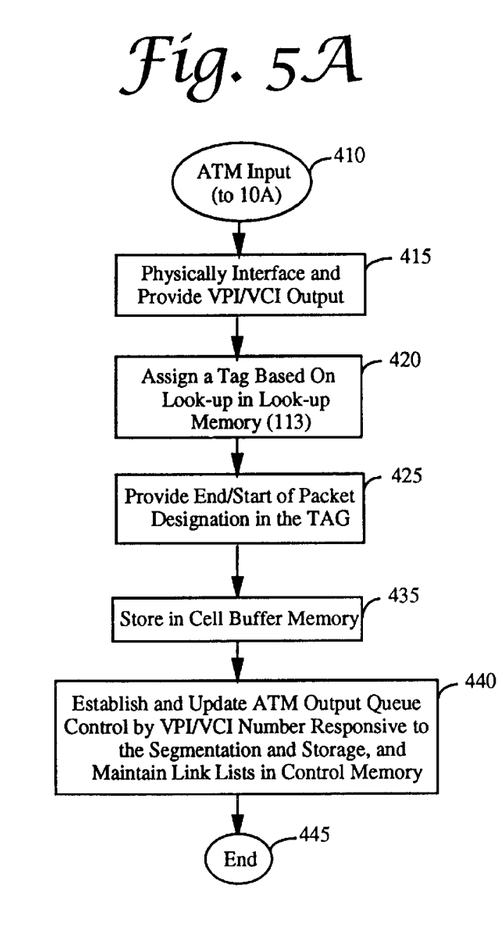
FIG. 5A shows the processing flow of ATM inputs into the input interface 10A.

Referring to FIG. 5A, operation of the ATM interface subsystem 10A is shown in state flow format. At state 410, there is an ATM input to the subsystem 10A (step 410), which the system 5 physically interfaces (step 415) and provides an VPI/VCI output (step 420), wherein the system 10A assigns a tag based on a lookup in the lookup memory 113. The system 10A provides for encapsulation of all input (step 425), responsive to the assignment of the tag (step 420). The encapsulated datagram is segmented (step 430), that is, chopped up into cell size groupings, and a header and tag is attached. The system stores the cell in the cell buffer memory 108 responsive to the queue controller 109 (step 435). The system establishes and updates the ATM output queue control based on VPI/VCI number responsive to the segmentation and storage (step 440). The process is completed (step 445), and the interface of input into and through the ATM interface subsystem 10A to the queue memory and controller 114 is accomplished.

Figure 5B:
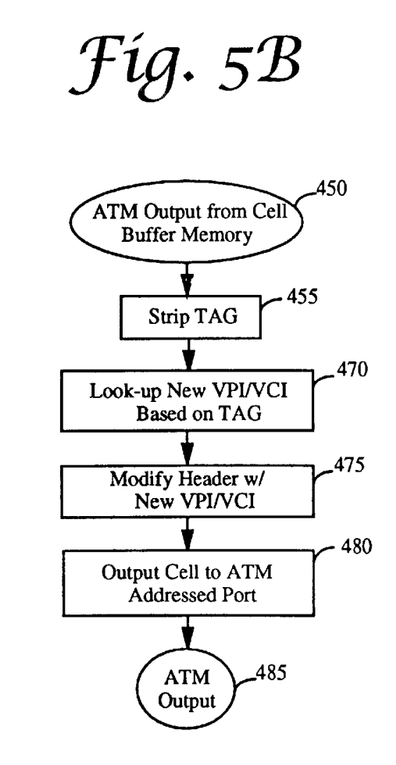
FIG. 5B illustrates the process flow for the ATM output from the interface output 10A.

FIG. 5B illustrates the ATM output processor 102 operational flow. The ATM output is coupled to the output processor 102 from the output bus B2 (step 450). The subsystem 10A first strips the header as illustrated (step 455), which is used to de-encapsulate the segmented cell (step 460), and responsive to the queue controller 109, resegments the chopped up cells via the cell demultiplexer 126. The queue controller 109 looks up the VPI/VCI routing in the lookup memory 113, and outputs VPI/VCI routing data to the queue controller 109 (step 475) to permit the selective enablement of output from the cell buffer memory 108 to the external ATM hosts A10 as an ATM output at step 485, responsive to the VPI/VCI routing at step 480.

Figure 6A:
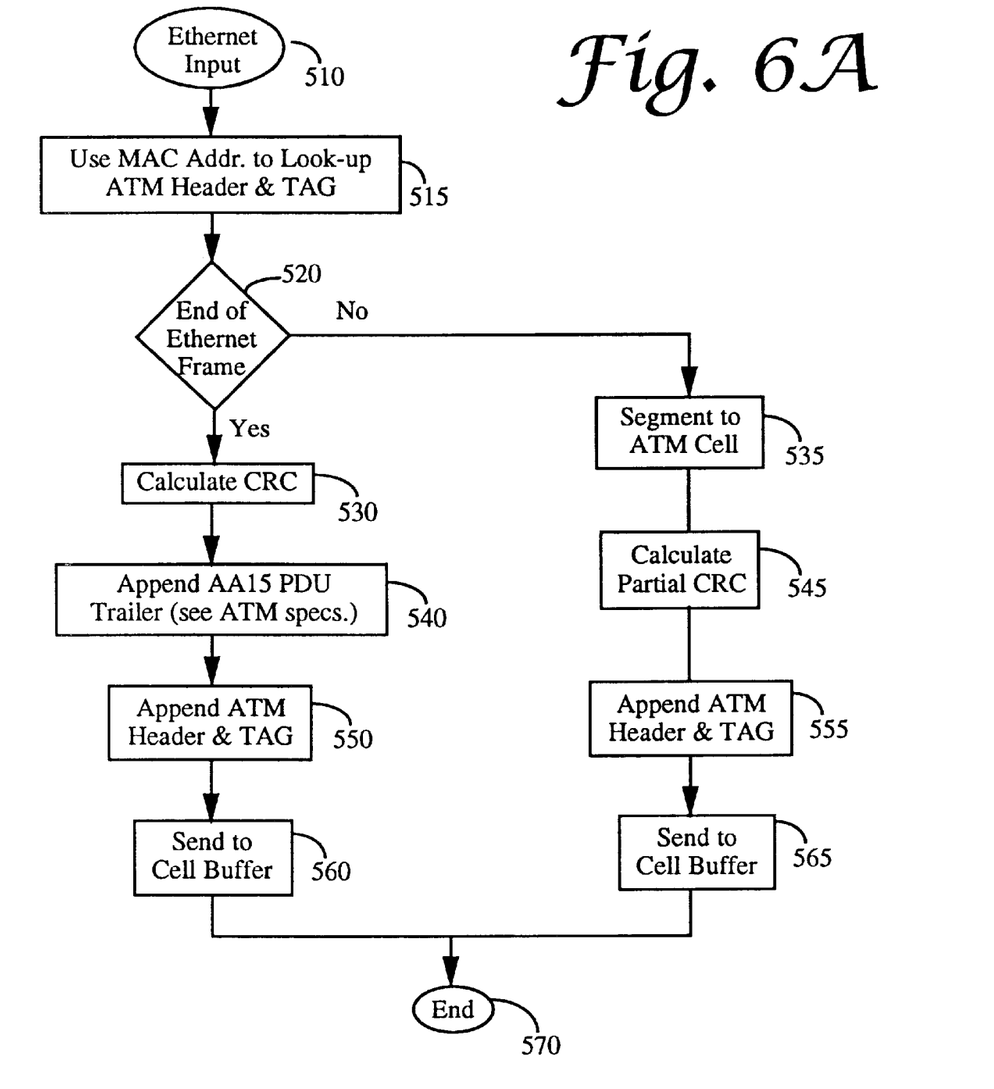
FIG. 6A illustrates the process flow chart for Ethernet input to the interface 10E.
Figure 6B:
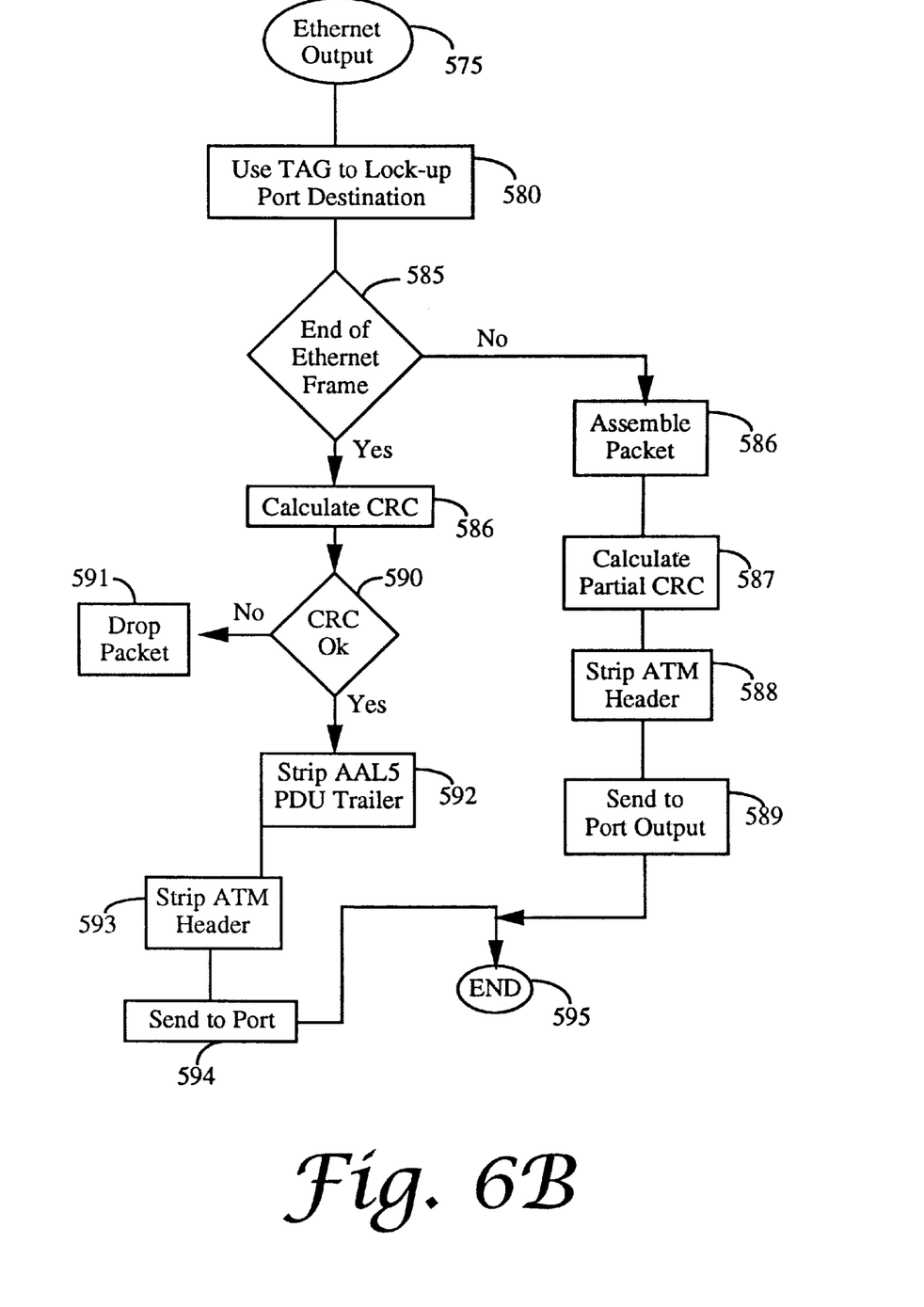
FIG. 6B illustrates the process flow of the Ethernet output from the interface 10E.

FIGS. 6A and 6B similarly illustrate the operation of the Ethernet input and output processes. Referring to FIG. 6A, an Ethernet input 510 is received and processed as in step 515, to provide both physical interface and decoding, and produce a MAC address output, and assign a tag responsive to the MAC address and the lookup memory output. Step 525 provides encapsulation of the Ethernet packet, thereafter segmenting the Ethernet packet into tagged ATM cells 535, which are stored in the cell buffer memory 108, step 565, responsive to the queue controller 109. The queue controller 109 establishes and updates the Ethernet output queues (and the VPI/VCI queues) in the control memory 110 and processing of the Ethernet input is completed at step 570.

Referring to FIG. 6B, an Ethernet output 575 is provided to the interface system 10E (step 555). The system 10E strips the header from the Ethernet packet and provides for encapsulation (step 585), and re-segments the chopped up cells into packets (step 586). The queue controller 109 looks up the MAC routing in the lookup memory 113 and provides control of the routing to permit the re-segmented packets to be communicated to an appropriate respective port. The process is then complete at step 595.

Referring to FIG. 7, the link list control, buffer control, and queue management operation and storage structure of the present invention is shown in detail.

The ATM host sources provide signals $A_1$–$A_N$ to the ATM interface system 10A which provides for lookup of the tag based on the header in lookup subsystem 605, which modifies the header 610 and adds the routing tag in 615 to provide ATM outputs $A_1$–$A_N$ which are then coupled to the buffer control 650 to provide control information used by the buffer controller by both the input arbitrator 660 and output arbitrator 665 in conjunction with the linked list controller 670. Under the direction of the controller memory 110, and optionally external control memory 110A, controller system 130 properly stores and maps all stored cells in the queue memory (as output queues for each VPI/VCI address 230, each output queue representing a separate VPI/VCI queue 250 for ATM address output signals $A_1$–$A_N$ VPI/VCI locations).

Concurrently, separate output queues 220 are also maintained for each MAC address (for each MAC Ethernet output address). An output queue is maintained for each input queue designating a respective MAC output ($E_1$–$E_N$) in a queue 220, for all output MAC addresses.

There are a plurality of the output queues 220. Each Ethernet output queue 220 is comprised of a plurality of input queues (forming a subsystem) for each Ethernet output, one input queue for each and every one of the input sources that references a respective Ethernet output ($E_1$–$E_N$) for the respective associated queue 220.

By maintaining separate output queues for VPI/VCI addresses and for Ethernet output MAC addresses, and by further maintaining (within the Ethernet output queues) an output queue for each Ethernet output host, comprised of a queue for every Ethernet input source referencing that output), an accurate shared switch resource provides a hybrid switch in a transparent manner. This novel storage and management system and methodology further provides advantages of automatically and inherently performing and utilizing the segmentation assembly and re-assembly functions in the state flow of operations and the link list control and output queue control structures.

Continuing to refer to FIG. 7, the combined cell and header 601 is coupled to the ATM inputs of the interface system 10A. The datagram 601 is comprised of a cell portion 602 and a header portion 603. This cell is communicated along with the header obtained through the lookup of the tag at lookup subsystem 605, and the header is modified to provide a modified datagram 611 comprising the cell 602 and a modified header H*, 606 and a modified tag T*, 609. This is communicated as $A_1$–$A_N$ out (of the cell header and tag datagram 611) to the buffer control 650, as described above.

In a similar manner, Ethernet inputs $E_1$–$E_N$ are coupled to the Ethernet interface subsystem 10E. The Ethernet input is comprised of a datagram 620 comprising a packet having a data portion 624 and a header portion 626. The Ethernet interface subsystem 10E provides lookup of the tag based on the header at lookup subsystem 625, and provides encapsulation based on MAC address, in the MAC subsystem 630, which provides segmentation of the data portion 624, providing cell padding and removal at cell removal subsystem 645 as needed, and attaches a new header and tag (e.g., 628 and 629 for datagram 621) at tag subsystem 640 to provide an Ethernet input system output $E_1$–$E_n$ out for coupling to the input arbitrator 660 of the buffer control 650.

The link list controller 670 maintains queues in cell buffer memory 108 within queue memory 114 responsive to a link control memory 675 (and optionally, memory 110) and provides memory control responsive thereto. The link list controller 670 establishes and maintains the link lists in the control memory 110 to provide for the set up and maintenance of the output queues for (1) all VPI/VCI addresses and (2) all Ethernet output addresses for all Ethernet inputs referencing that output. The link list controller 670 output provides for control of communication from the output queues to the output arbitrator 665 and from the input arbitrator 660.

In accordance with the present invention, the queue controller 109 provides a system providing the means to control the hybrid switch and provides for maintenance of virtual queues which accommodate the varying Ethernet packet sizes and adapts to the input needs in reference to outputs in the Ethernet environment to optimize system operation and provide faster throughput and more economical construction. Although subsystems 10A and 10E are illustrated for input only, there are corresponding output subsystems in each of them which function as described with reference to the other figures herein.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A communications switch having at least two independent sources for input and output, one source each of data in a received ATM format and an Ethernet format, each of the sources providing data cells comprised of a payload and associated header and tag data, said payload having an associated destination, said switch comprising:

an addressable memory;

first means for converting data from a first one of said sources from Ethernet to an internal ATM format;

second means for converting data from a second one of said sources from a received ATM format to the internal ATM format;

third means for converting the retrieved internal ATM format to Ethernet format;

fourth means for converting the retrieved data from the internal ATM format to the received ATM format;

a link controller for managing the storage and retrieval of the data in the internal ATM format to and from the memory, in a mapping from respective ones of the independent sources via a respective one of the first and second means for converting, and to respective ones of the independent sources via the third and fourth means for converting responsive to the associated destination for the respective data; and means for outputting the converted retrieved data to the respective associated destination responsive to the link controller.

2. The switch as in claim 1, wherein said link controller provides means for initializing and controlling storage in a control memory to maintain a queuing structure and providing for correlating and mapping, for storage and retrieval in the addressable memory, the data in a mapping from each input source to a respective one of the output sources.

3. The switch as in claim 2, wherein said queuing structure is comprised of separate first and second groupings of queues;

said first grouping correlating and mapping from a first set of queues for each output source of Ethernet format data, said first set comprising a queue for each of the input sources of data in the Ethernet format which is to be output from the respective output source of the Ethernet format data;

wherein there is a connection ID for the input and output source of data in the ATM format;

said second grouping correlating and mapping for each of the output sources of data in the ATM format, from each of the input sources providing the data in the ATM format, to the output in the ATM format, for each of the connection IDs.

4. The system as in claim 3, wherein said link controller maintains a linked list of locations in the addressable memory corresponding to the first and second groupings.

5. A communications switching system comprising:

a first set of input sources and output ports of providing for the input and output, respectively, of data in Ethernet format;

a second set of input ATM sources and output ATM ports providing for the input and output of data in a first ATM format;

wherein each of said first and second input sources and first and second output ports each has at least one first associated connection ID;

means for converting data from one of the Ethernet format and from the first ATM format, into an internal ATM format;

means for converting data from the internal ATM format to one of the Ethernet format and the first ATM format;

a buffer memory;

a buffer memory control subsystem comprised of:

means for storing and retrieving data in the internal ATM format from the buffer memory, and for maintaining a queuing structure for the buffer memory, said queuing structure comprised of first and second independent groupings of sets of input-to-output mapping queues, each of said first and second groupings corresponding to the respective first and second sets of input sources;

wherein the sets of said first grouping are comprised of first grouping sets, wherein each of the first grouping sets is comprised of a separate queue for each of the input sources;

wherein one of the first grouping sets is provided for each of the plurality of output ports of said first grouping;

wherein the sets of the second grouping are comprised of one queue for each said connection ID; and data link means for maintaining a linked list of memory locations, wherein said data is comprised of first cells for the data in the Ethernet format, and second cells for the data in the ATM format, respectively stored corresponding to said first grouping and said second grouping association of input sources and output ports for respective ones of the first and second cells.

6. The communications switching system of claim 5, wherein each of said first cells is associated with a respective packet having a start of packet cell and an end of packet cell; and wherein the data link means is further comprised of first completed cell means for maintaining information regarding the start of packet and end of packet cells for each packet stored in a respective one of said queues.

7. The communications switching system of claim 6, wherein output of said first cells from the buffer memory begins responsive to the first completed cell means having both the start and end of packet cells information for the packet to be output.

8. The communications switching system of claim 5, wherein the data for each of said input sources and output ports is comprised of tag data associated with the respective connection ID, wherein the buffer control subsystem is further comprised of:

data link list control means, responsive to said tag data, for selecting one of the queues from the memory for storage of the respective one of the first and second cells associated with the tag data; and memory control means, responsive to the link list control means, for determining the address in memory to which to selectively perform one of read and write of the respective one of the first and second cells.

9. The communications switching system of claim 5, wherein the data in the Ethernet format is comprised of Ethernet packets comprised of packet first connection identifiers and packet payload data, wherein each of the first set of input sources and output sources are further comprised of:

means for coupling the Ethernet packets;

means for providing packet encapsulation data;

means for appending the provided encapsulation data to at least one said Ethernet packet to create an encapsulated packet;

means for creating second associated connection identifiers and tag data responsive to said packet first connection identifiers;

means for segmenting the encapsulated packet into a plurality of cell payloads;

means for appending the second connection identifier data and tag data to the respective associated ones of the plurality of the cell payloads to provide appended cells; and means for storing, via said buffer memory control subsystem, the appended cells in the buffer memory.

10. The communications switching system of claim 5, wherein the data in the first ATM format is comprised of cells, each cell comprising ATM cell first connection identifier data and ATM payload data, each of the second sets of input sources and output sources further comprising:

means for creating ATM cell second connection identifier data and tag data, responsive to the ATM cell first connection identifier data;

means for appending the ATM cell second connection identifier data and the ATM payload data to provide appended ATM cells; and means for storing, via said buffer memory control subsystem, the appended ATM cells.

11. The communications switching system of claim 9, wherein each of the second set of input sources and output sources are further comprised of:

means for coupling to ATM cells comprised of ATM cell first connection identifier data and ATM payload data;

means for creating second ATM connection identifier data and tag data, responsive to the ATM first connection identifier data;

means for appending the second connection identifier data and tag data to the respective cell payload data; and means for storing, via said buffer memory control subsystem, the appended ATM cells.

12. A hybrid switching system for coupling to a first set of input sources and output ports for coupling a plurality of Ethernet formatted packets of data, a second set of input sources and output ports for coupling a plurality of ATM formatted data, wherein each of said first and second input sources and output ports has an associated connection ID, said system further comprising:

first means coupled to the first set of input sources for converting the Ethernet formatted packets of data into internal ATM formatted data cells;

second means coupled to the second set of input sources for converting the ATM formatted data into internal ATM formatted data cells;

a queue buffer memory providing for storage and retrieval of the internal ATM formatted data cells;

third means coupled to the first set of output ports for converting the internal ATM formatted data cells into the Ethernet formatted packets of data for output;

fourth means coupled to the second set of output ports for converting the internal ATM formatted data cells into the ATM formatted data for output;

a queue buffer control subsystem coupled to the first, second, third, and fourth means, and to the queue buffer memory, said control subsystem comprised of:

means for storing and retrieving said internal ATM formatted data cells to and from the buffer memory and for maintaining a cell queuing structure in said buffer memory, said cell queuing structure comprising first and second independent groupings of sets of input source-to-output port mapping queues for the internal ATM formatted data cells stored in the buffer memory, each of said first and second groupings corresponding to respective ones of said first and second sets of input sources and output ports;

wherein one set of the queues of said first grouping set of queues is provided for each respective one of said plurality of output ports of the first set;

wherein each said one set of the queues of said first grouping sets of queues is comprised of a separate queue for each of the input sources which has data for output for the respective one of the Ethernet formatted data output ports; and wherein each set of the second grouping is comprised of one queue for each of the associated connection IDs for each one of the ATM formatted data output ports of the second set for which there is data for output.

13. The system as in claim 12, further comprising:

link means for maintaining a linked list of locations in the buffer memory where the internal ATM formatted data cells are stored, said linked list corresponding to a mapping of the input sources and output ports for each of said internal ATM formatted data cells.

14. The system of claim 13, wherein said link means is further comprised of means for maintaining tag information for the Ethernet formatted input data regarding start of packet and end of packet for said respective stored one of the internal ATM formatted data cells.

15. The system of claim 14, wherein said buffer control subsystem is further comprised of:

link list control means, responsive to said tag information, for determining a location in the buffer memory for storage and retrieval of the respective internal ATM data cell associated with the tag, and for storing associated control information in the linked list.

16. The system as in claim 15, wherein said buffer control subsystem determines an address in the buffer memory to which to selectively perform one of a read from and write to the contents of said respective address in the buffer memory, responsive to said link list control means.

17. The system of claim 12, wherein each of said first set of input sources and output ports are further comprised of:

means for coupling said Ethernet formatted packets, wherein said Ethernet formatted packets are comprised of packet connection identifiers and packet payload data;

means for providing packet encapsulation data;

means for appending said encapsulation data to a selected packet to create an encapsulated packet;

means for creating first connection identifier and tag data responsive to said packet connection identification data;

means for segmenting an encapsulated packet to create a plurality of corresponding internal ATM formatted data cell payloads;

means for creating appended data cells by appending said first connection identifier and tag data to the respective corresponding ones of said plurality of internal ATM formatted data cell payloads; and means for providing the appended data cells for storage to said buffer memory via said queue buffer control subsystem.

18. The system of claim 17, wherein each of said internal ATM formatted data cells is comprised of ATM cell connection identifier data and ATM payload data, wherein each of said second set of input sources and output sources are further comprised of:

means for creating second connection identifier data and tag data, responsive to said ATM cell connection identifier data; and means for appending the second connection identifier data to respective ones of said ATM payload data to provide and output a new ATM cell.

* * * * *